US006728519B1

(12) United States Patent
Okuda

(10) Patent No.: US 6,728,519 B1
(45) Date of Patent: Apr. 27, 2004

(54) PORTABLE INPUT DEVICE

(75) Inventor: Tatsumi Okuda, Motosu-gun (JP)

(73) Assignee: Sanyo Electric Co., Ltd., Moriguchi (JP)

(*) Notice: Subject to any disclaimer, the term of this patent is extended or adjusted under 35 U.S.C. 154(b) by 442 days.

(21) Appl. No.: 09/669,893

(22) Filed: Sep. 27, 2000

(30) Foreign Application Priority Data

Sep. 30, 1999 (JP) ........................................... 11-278449

(51) Int. Cl.[7] .................................................. H04B 1/38
(52) U.S. Cl. ....................... 455/90.3; 455/347; 455/550; 455/575.1
(58) Field of Search .......................... 455/90, 550, 566, 455/575, 90.3, 575.1, 351, 347, 348, 349; 345/169, 173

(56) References Cited

U.S. PATENT DOCUMENTS 5,572,573 A * 11/1996 Sylvan et al. ............... 455/556
5,745,566 A * 4/1998 Petrella et al. .......... 379/433.13
5,768,370 A * 6/1998 Maatta et al. ........... 379/433.01
5,982,881 A * 11/1999 Mischenko ............ 379/433.11
6,003,008 A * 12/1999 Postrel et al. ................ 705/4

* cited by examiner

Primary Examiner—Nguyen T. Vo
Assistant Examiner—T Richard Lei
(74) Attorney, Agent, or Firm—Armstrong, Kratz, Quintos, Hanson & Brooks, LLP

(57) ABSTRACT

The invention provides a portable input device comprising a front panel 2 providing a portion of a casing, and a touch panel 3 accommodated in a recessed portion 24 formed in the front panel 2. The recessed portion 24 has a transparent part opposed to the screen of a display 6. The surface of the front panel 2 is provided with an exterior sheet 4 covering the touch panel 3 in the recessed portion 24. The exterior sheet 4 has a transparent portion opposed to a manipulation surface of the touch panel 3. An outer peripheral portion of the exterior sheet 4 has a rear surface adhered to the surface of a panel affixing portion 27 formed around the recessed portion 24. The input device is easy to assemble and usable for inputting data without the likelihood of dust and the like ingressing into the device.

4 Claims, 5 Drawing Sheets

PORTABLE INPUT DEVICE

FIELD OF THE INVENTION

The present invention relates to devices, such as portable telephones, which have an input manipulation portion on the surface of a casing, and more particularly to an input device providing an input manipulation portion.

BACKGROUND OF THE INVENTION

Already known are cellular phones, i.e., portable telephones, comprising a liquid-crystal display and a touch panel which are provided in combination on the surface of a casing. The display is adapted to present data thereon, while the touch panel enables the user to input data.

For example, FIG. 6 shows a portable telephone having a casing which comprises a front case 11 and rear case (not shown). Provided inside the casing is a circuit board 7 which has a liquid-crystal display 6 mounted on its upper surface. The display 6 has a rectangular screen and a frame 61 surrounding the screen, and is fixedly mounted on the circuit board 7.

The front case 11 has a rectangular first opening 16 corresponding to a large rectangular region included in the screen of the display 6 and positioned toward the head side of the casing, and a rectangular second opening 17 corresponding to the remainder of the display screen, i.e., a relatively small rectangular region thereof. The front case 11 therefore has a slender bar portion 14 formed between the first opening 16 and the second opening 17.

A front panel 2 forming a portion of the front case 11 has a rectangular screen portion 21 corresponding to the first opening 16 of the front case 11, a rectangular window 22 corresponding to the second opening 17 of the front case 11, and a slender bar portion 23 formed between the screen portion 21 and the window 22 and to be lapped over the bar portion 14 of the front case 11. A touch panel 3 is held between the inner peripheral edge of the front panel 2 which defines its window 22 and the inner peripheral edge of the front case 11 which defines the second opening 17 thereof.

Disposed between the liquid-crystal display 6 on the circuit board 7 and the front case 11 is a transparent back plate 5 to be in intimate contact with the rear surface of the touch panel 3. The back plate 5 is in the form of a rectangular body shaped in conformity with the contour of the touch panel 3 and provided with a pair of lugs 51, 51. The back plate 5 is attached to the rear side of the front case 11 by the engagement of these lugs 51, 51 with the rear side of the casing 1.

FIG. 5 shows the display portion and the touch manipulation portion of the portable telephone in section in greater detail. The back plate 5 is attached to the front case 11 by the engagement of the pair of lugs 51, 51 with a pair of hooks 19, 19 formed on the front case 11. The front case 11 has a panel affixing portion 18 formed around the second opening 17, and the outer peripheral portion of the touch panel 3 has its rear surface adhered to the surface of the affixing portion 18 with a double-faced adhesive tape 83. The front panel 2 is provided over the first opening 16 and the second opening 17 of the front case 11, and the inner peripheral portion thereof defining the window 22 and the outer peripheral part of the screen portion 21 are adhered to the surfaces of the touch panel 3 and the front case 11 with a double-faced adhesive tape 84.

With the portable telephone described, the image of a manual key is presented on the screen of the liquid-crystal display 6 in the casing for the touch panel to detect the depression of the key image for inputting data. Accordingly, if the display 6 shows a plurality of key images selectively upon a change-over, an increased number of functions can be realized by key manipulation.

With the telephone shown in FIGS. 5 and 6, however, it is necessary to attach the back plate 5 to the front case 11 from the rear side thereof and to attach the touch panel 3 and the front panel 2 to the front case 11 from the front side thereof. Thus, the telephone has the problem of necessitating a complex procedure because the parts need to be joined to the front case 11 from two directions.

Further when the touch panel 3 is depressed for inputting data, the downward pressure is received by the back plate 5, which is merely engaged with the hooks 19, 19 of the front case 11 and therefore fails to fully receive the pressure. Consequently, the touch panel 3 is forced down by the downward pressure and likely to peel off the double-faced adhesive tape 84 adhering the rear surface of the front panel 2 to the front surface of the touch panel 3. This entails the problem of forming a clearance between the front panel 2 and the touch panel 3 and permitting dust to ingress into and remain in the clearance.

SUMMARY OF THE INVENTION

An object of the present invention is to provide a portable input device which can be assembled easily, and is usable for inputting data without the likelihood of dust and the like ingressing into the device.

The present invention provides a portable input device which comprises a casing 1 having a display 6 disposed therein. The casing 1 is provided with a touch panel 3 at least partially covering a screen of the display 6 and is formed in a surface thereof with a panel receiving recessed portion 24 having the touch panel 3 accommodated therein. The recessed portion 24 has a transparent part opposed to the screen of the display 6. The surface of the casing 1 is provided with an exterior sheet 4 covering the touch panel 3 accommodated in the recessed portion 24. The exterior sheet 4 has a transparent portion opposed to a manipulation surface of the touch panel 3, and an outer peripheral portion which has its rear surface adhered to a surface of a panel affixing portion 27 formed around the recessed portion 24.

The portable input device of the present invention can be assembled by fitting the touch panel 3 and the exterior sheet 4 successively into the recessed portion 24 formed in the casing 1 from the front surface side of the casing 1, so that these components can be joined to the casing 1 in only one direction, hence a simplified procedure.

Further when the touch panel 3 is depressed by pressing the surface of the exterior sheet 4 to input data, the downward pressure is reliably received by the panel receiving recessed portion 24 to result in only a slight depression. Moreover, since the outer peripheral portion of the exterior sheet 4 covering the surface of the touch panel 3 has its rear surface adhered to the surface of the panel affixing portion 27 formed around the recessed portion, the downward pressure on the touch panel 3 is unlikely to act in a direction to separate the adhesive joint. This eliminates the likelihood that the exterior sheet 4 will become separated from the casing 1 at the joint, consequently precluding dust and the like from ingressing into the separation.

Stated more specifically, the recessed portion 24 is formed integrally with a front panel 2 made of resin and providing a portion of the casing 1. This gives the recessed portion 24 a high structural strength to reliably receive the downward pressure on the touch panel 3, also ensuring high liquid-tightness.

Further stated more specifically, the recessed portion 24 has a plurality of pins 26 projecting upward from a bottom wall thereof and extending through respective circular holes 32 formed in an outer peripheral portion of the touch panel 3. The touch panel 3 can then be fitted into the recessed portion 24 easily with high accuracy for assembly.

Further stated more specifically, the outer peripheral portion of the exterior sheet 4 is held raised by upper ends of the pins 26. With this construction, the state of contact between the touch panel 3 and the exterior sheet 4 can be adjusted according to the height of the pins 26, whereby the sensitivity of the touch panel 3 to the depression can be determined optimally.

Thus, the portable input device of the present invention can be assembled easily, and is usable for inputting data without permitting the ingress of dust and the like.

DETAILED DESCRIPTION OF EMBODIMENT

Figure 5:
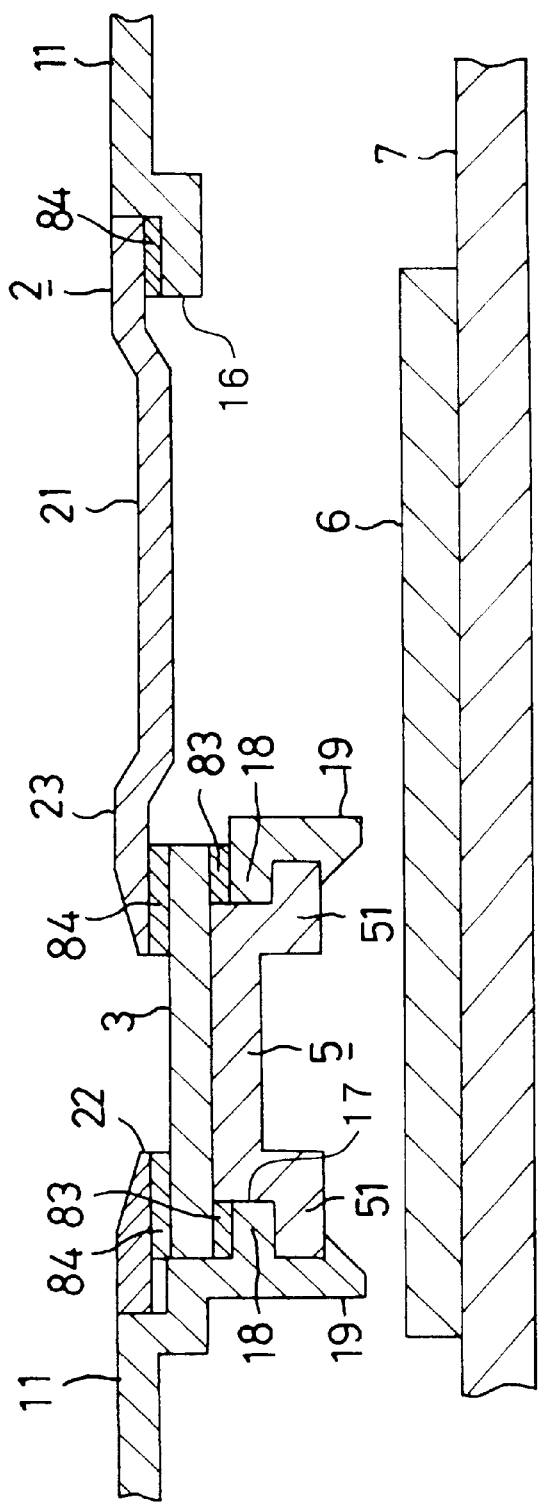
FIG. 5 is an enlarged view in section of a display portion and a touch manipulation portion of a conventional portable telephone.
Figure 6:
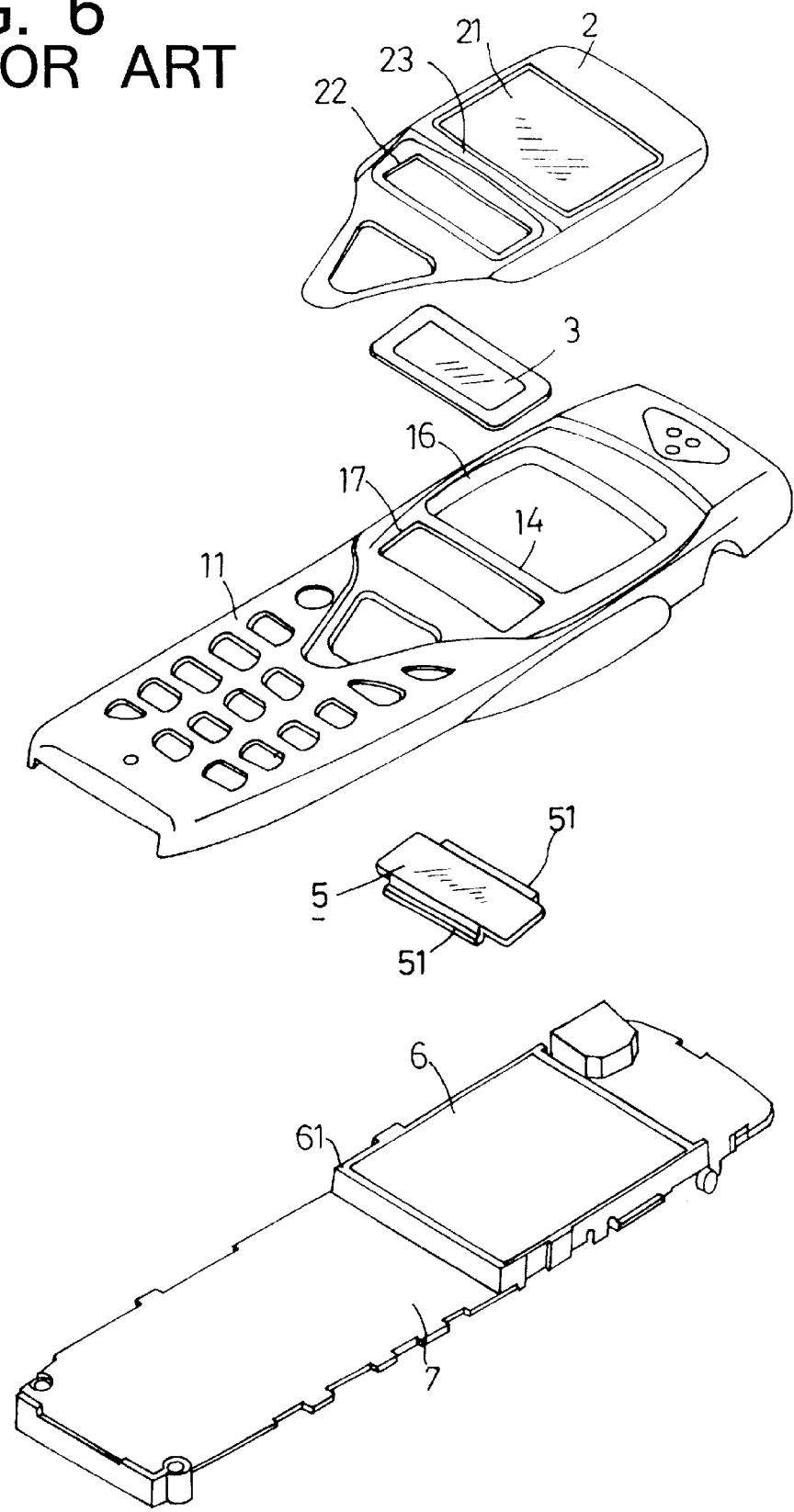
FIG. 6 is an exploded perspective view of the conventional portable telephone.

A portable telephone embodying the present invention will be described below in detail with reference to FIGS. 1 to 4. Throughout these drawings and FIGS. 5 and 6 showing the conventional portable telephone, like parts are designated by like reference numerals and will not be described again when so desired.

Figure 1:
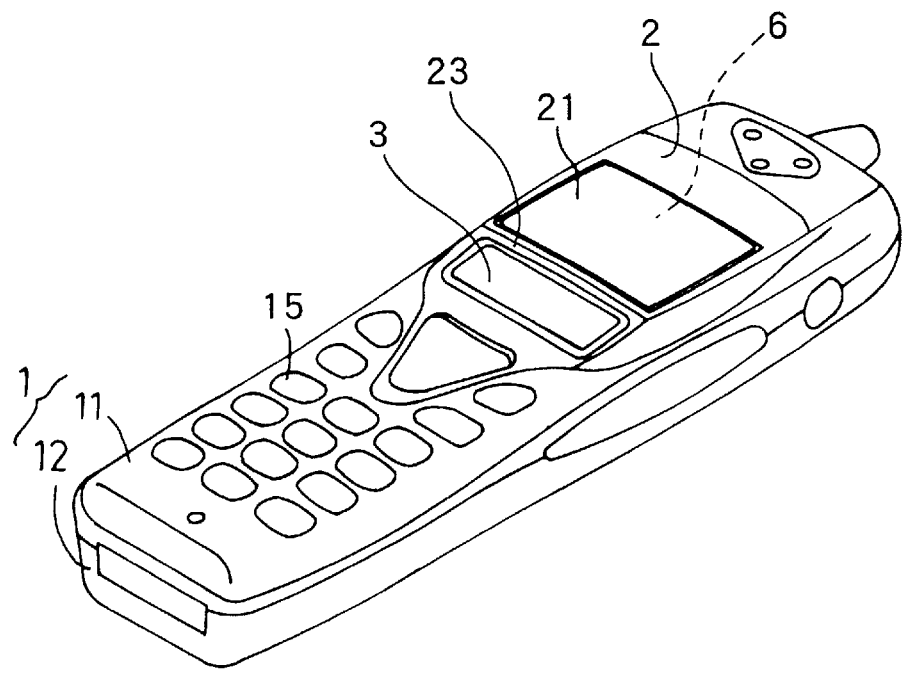
FIG. 1 is a perspective view showing a portable telephone as seen from the front side thereof and to be provided as an embodiment of the invention.
Figure 2:
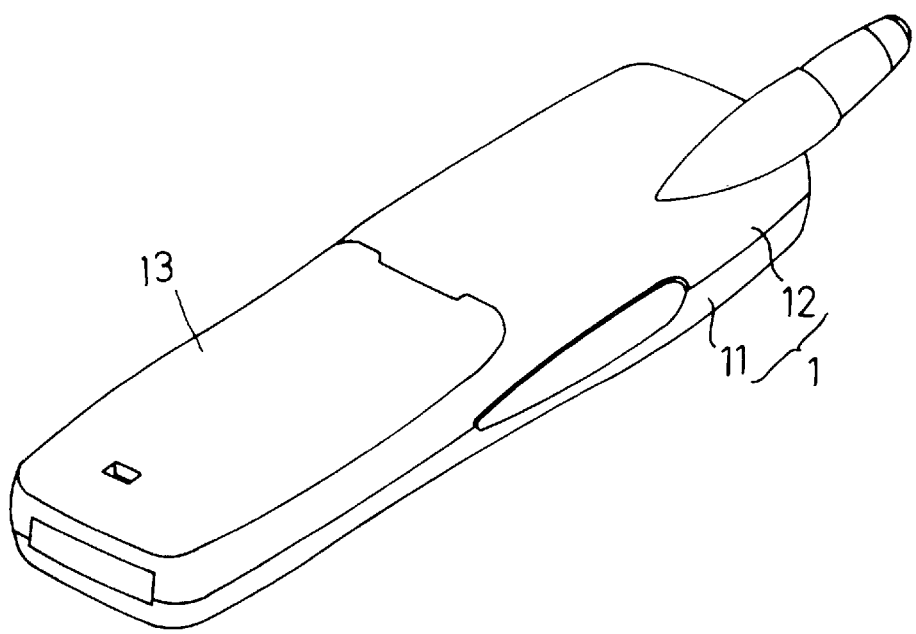
FIG. 2 is a perspective view of the telephone as it is seen from behind.

With reference to FIG. 1, the portable telephone of the present invention has a flat casing 1 comprising the combination of a front case 11 and a rear case 12 which are made of a synthetic resin. A liquid-crystal display 6 has a surface providing a display portion, and a touch panel 3 has a surface serving as a touch manipulation portion. The front case 11 has a surface provided with a plurality of manual keys 15. As seen in FIG. 2, the rear case 12 has a rear lid 13 removably attached thereto and openable when a cell housed in the casing 1 is to be replaced.

Figure 4:
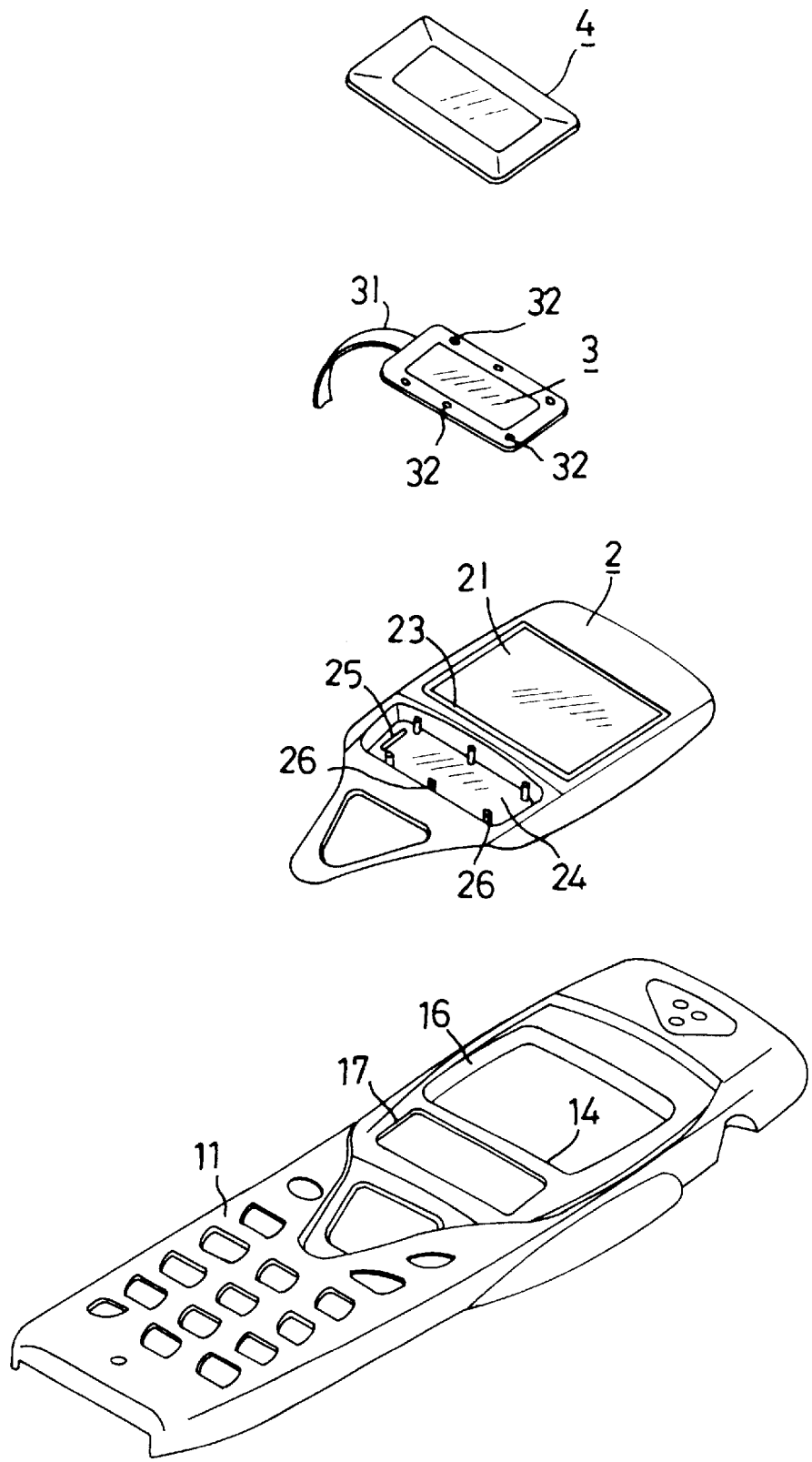
FIG. 4 is an exploded perspective view of a front case, front panel, touch panel and exterior sheet.

With reference to FIG. 4, the front case 11 is formed with a first opening 16 and a second opening 17 for exposing the display portion and the touch manipulation portion, respectively. Covering these openings 16, 17 is a front panel 2 forming a portion of the front case 11. The front panel 2 has a rectangular transparent screen portion 21 formed integrally therewith and corresponding to the first opening 16 of the front case 11, and a transparent panel receiving recessed portion 24 formed integrally with the panel 2, projecting downward and corresponding to the second opening 17 of the front case 11. Formed between the screen portion 21 and the recessed portion 24 is a slender bar portion 23 to be lapped over a bar portion 14 of the front case 11.

A plurality of upwardly projecting pins 26 are provided on the bottom wall of the panel receiving recessed portion 24, as arranged along the wall outer periphery. On the other hand, the touch panel 3 is formed in its outer peripheral portion with a plurality of circular holes 32 for the respective pins 26 to extend therethrough, and a slot 25 for inserting therethrough a flexible lead 31 extending from the touch panel 3. A transparent exterior sheet 4 made of PET and having a thickness of about 0.1 to about 0.2 mm covers the touch panel 3 as accommodated in the recessed portion 24 to provide the surface of the front case 11.

Figure 3:
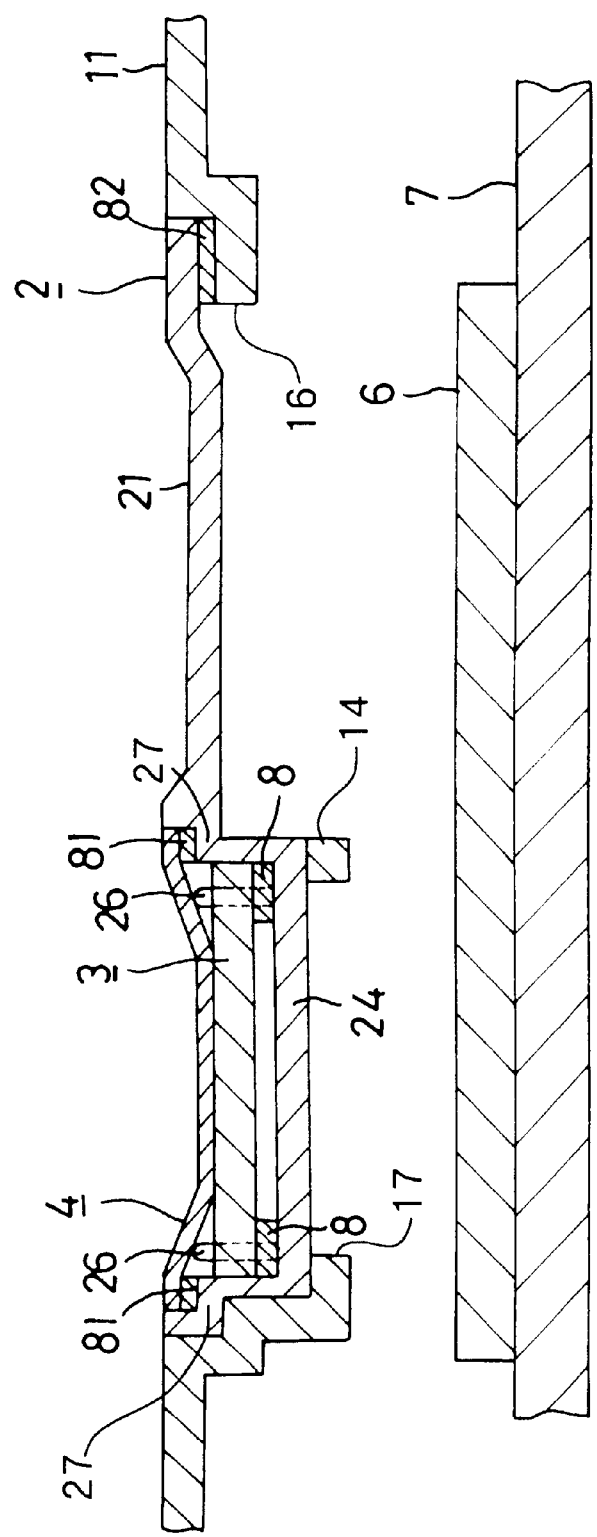
FIG. 3 is an enlarged view in section of a display portion and a touch manipulation portion of the telephone embodying the invention.

FIG. 3 shows the display portion and the touch manipulation portion of the portable telephone in greater detail in section. A circuit board 7 is positioned below the front case 11, with the liquid-crystal display 6 mounted on the upper surface of the board 7. The front panel 2 is provided on the surface of the front case 11 to cover the two openings 16, 17, and is secured to the front case 11 with a double-faced adhesive tape 82. The touch panel 3 is accommodated in the recessed portion 24 of the front panel 2, and the rear surface of the touch panel 3 is adhered at its outer peripheral portion to the bottom wall of the recessed portion 24 with a double-faced adhesive tape 8.

When the touch panel 3 is to be placed into the recessed portion 24, the pins 26 on the recessed portion 24 are inserted through the respective circular holes 32 of the touch panel 3 shown in FIG. 4, whereby the touch panel 3 and the front panel 2 can be assembled easily with high accuracy.

Further as seen in FIG. 3, the exterior sheet 4 is provided to cover the touch panel 3 within the recessed portion 24. The sheet 4 has its outer peripheral portion held raised by the pins 26 projecting from the recessed portion 24. The rear surface of the outer peripheral portion of the exterior sheet 4 is adhered with a double-faced adhesive tape 81 to the surface of a panel affixing portion 27 formed around the recessed portion 24. The panel affixing portion 27 is a stepped portion lower than the surface of the front panel 2, whereby the surface of the exterior sheet 4 is made flush with the surfaces of the front case 11 and the front panel 2.

The portable telephone described can be assembled by joining the touch panel 3 and the exterior sheet 4 successively to the panel receiving recessed portion 24 formed in the casing 1, from the front side of the casing. Since these components can be thus attached to the casing 1 from one direction, the telephone can be assembled by a simplified procedure. The touch panel 3 can be deformed along the curved surface of the bottom wall of the recessed portion 24 by pressing the touch panel 3 against the bottom wall of the recessed portion 24 in this procedure.

The recessed portion 24 is formed integrally with the front panel 2. This gives the recessed portion 24 a high structural strength to reliably receive the downward pressure on the touch panel 3 while assuring the casing 1 of high liquid-tightness.

Further when the touch panel 3 is depressed by pressing the surface of the exterior sheet 4 to input data, the downward pressure is reliably received by the recessed portion 24 to result in only a slight depression. Since the outer peripheral portion of the exterior sheet 4 covering the surface of the touch panel 3 has its rear surface adhered to the surface of the panel affixing portion 27 formed around the recessed portion 24, the downward pressure on the touch panel 3 is unlikely to act in a direction to separate the adhesive joint.

Accordingly, even if the touch panel 3 is manipulated repeatedly, the touch panel 3 or the exterior sheet 4 will not be separated off at the joint formed by the double-faced adhesive tape 8 or 81. This reliably precludes the ingress of dust, water, and the like.

Further with the portable telephone of the present invention, the thickness (e.g., 0.1 to 0.2 mm) of the exterior sheet 4 is smaller than the thickness (e.g., 0.8 mm) of the front panel 2 as shown in FIG. 3, so that the depth of the touch manipulation surface from the surface of the front case 11 is smaller than in the conventional portable telephone shown in FIG. 5, hence facilitated manipulation by touching.

Additionally, the state of contact between the touch panel 3 and the exterior sheet 4 is adjustable according to the height of the pins 26 of the front panel 2, i.e., the amount of rise of the exterior sheet 4. This gives the touch panel 3 suitable sensitivity to manipulation by depressing, consequently obviating the likelihood that the portable telephone as placed in a pocket of the garment or in a bag will be inadvertently manipulated under pressure.

The device of the present invention is not limited to the foregoing embodiment in construction but can be modified variously by one skilled in the art without departing from the spirit of the invention as set forth in the appended claims. For example, the front panel 2 can be formed integrally with the front case 11. Furthermore, the present invention can be embodied not only as portable telephones but also as pagers, game machines and various other devices.

What is claimed is:

1. A portable input device comprising a casing having a display disposed therein, the casing including a front panel being provided with a touch panel at least partially overlying a portion of the display, the front panel having a display screen and being formed in a surface thereof with a touch panel-receiving recessed portion having the touch panel accommodated therein, the recessed portion having a transparent part spaced from the display screen, the surface of the front panel attaching an exterior sheet covering the touch panel accommodated in the recessed portion, the exterior sheet having a transparent portion opposed to a manipulation surface of the touch panel, and an outer peripheral portion of the exterior sheet having a rear surface adhered to a surface of a panel-affixing portion formed around the recessed portion.

2. A portable input device according to claim 1 wherein the front panel provides a portion of the casing and is made of resin, and the recessed portion of the front panel is formed integrally with the display screen portion thereof.

3. A portable input device according to claim 1 wherein the recessed portion has a plurality of pins projecting upward from a bottom wall thereof and extending through respective circular holes formed in an outer peripheral portion of the touch panel.

4. A portable input device according to claim 3 wherein the outer peripheral portion of the exterior sheet is held raised by upper ends of the pins.

* * * * *